United States Patent
Yamada

(10) Patent No.: US 12,434,579 B2
(45) Date of Patent: Oct. 7, 2025

(54) CONTROL APPARATUS FOR IN-WHEEL MOTOR VEHICLE

(71) Applicant: TOYOTA JIDOSHA KABUSHIKI KAISHA, Toyota (JP)

(72) Inventor: Kenji Yamada, Komaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 765 days.

(21) Appl. No.: 17/741,645

(22) Filed: May 11, 2022

(65) Prior Publication Data

US 2022/0396157 A1    Dec. 15, 2022

(30) Foreign Application Priority Data

Jun. 11, 2021   (JP) .................................. 2021-098042

(51) Int. Cl.
 *B60L 3/04*      (2006.01)
 *B60L 53/122*    (2019.01)
 *B60L 53/18*     (2019.01)
 *B60L 53/64*     (2019.01)
 *B60L 58/12*     (2019.01)
 *B60L 58/24*     (2019.01)

(52) U.S. Cl.
 CPC ............ *B60L 53/122* (2019.02); *B60L 53/18* (2019.02); *B60L 53/64* (2019.02); *B60L 58/12* (2019.02); *B60L 58/24* (2019.02)

(58) Field of Classification Search
 CPC ........ B60L 53/122; B60L 53/64; B60L 58/12; B60L 58/24; B60L 53/18

USPC .................................................. 318/139, 471
See application file for complete search history.

(56) References Cited

U.S. PATENT DOCUMENTS

| | | | | |
|---|---|---|---|---|
| 2003/0052650 | A1* | 3/2003 | Gunji ...................... | B60L 50/61 320/155 |
| 2019/0217850 | A1* | 7/2019 | Kai ......................... | B60K 6/20 |
| 2022/0173687 | A1* | 6/2022 | Choi ....................... | H02P 23/14 |

FOREIGN PATENT DOCUMENTS

| | | | |
|---|---|---|---|
| JP | 2005-166450 A | 6/2005 |
| JP | 2009-254161 A | 10/2009 |
| JP | 2017-005899 A | 1/2017 |
| JP | 2018-046742 A | 3/2018 |
| JP | 2019-033568 A | 2/2019 |

* cited by examiner

*Primary Examiner* — Erick D Glass
(74) *Attorney, Agent, or Firm* — Oliff PLC

(57) ABSTRACT

In a control apparatus for an in-wheel motor vehicle equipped with a motor provided in a tire wheel, at least one sensor provided in a case accommodating the motor, an electric power supply provided on a vehicle body and an electrical storage device that stores electric power, a controller provided on the vehicle body to control the motor, a power cable that connects the motor to the electric power supply and the electrical storage device, and a sensor cable that connects the sensor and the controller to each other, the controller is configured to perform disconnection control for discharging the electric power stored in the electrical storage device to an extra device when the sensor cable is disconnected.

10 Claims, 3 Drawing Sheets

CONTROL APPARATUS FOR IN-WHEEL MOTOR VEHICLE

CROSS-REFERENCE TO RELATED APPLICATION

This application claims priority to Japanese Patent Application No. 2021-098042 filed on Jun. 11, 2021, incorporated herein by reference in its entirety.

BACKGROUND

1. Technical Field

This disclosure relates to a control apparatus for an in-wheel motor vehicle that is equipped with motors in front wheels or rear wheels thereof respectively.

2. Description of Related Art

In Japanese Unexamined Patent Application Publication No. 2019-33568 (JP 2019-33568 A), there is described a control apparatus that detects that a connector on a motor side as a drive force source side and a connector on an electric power supply side are not connected to each other or that a power cable for connecting the motor and the electric power supply to each other is disconnected when a main switch of a vehicle is turned on. This control apparatus raises the voltage of a smoothing capacitor to a predetermined voltage that is relatively low by turning on a predetermined relay switch provided on a power control unit (PCU) that controls the electric power supplied to the motor, and then controls switch elements in such a manner as to electrically decouple the electric power supply and the smoothing capacitor from each other, and electrically couple the smoothing capacitor and the motor to each other. Moreover, the control apparatus is configured to determine that the connectors are not connected to each other or that the power cable is disconnected if the current caused to flow through the motor does not become a predetermined current when the smoothing capacitor and the motor are controlled to be electrically coupled to each other as described above.

SUMMARY

The control apparatus described in JP 2019-33568 A charges the smoothing capacitor at a relatively low voltage, then electrically decouples the electric power supply and the smoothing capacitor from each other, and also supplies electric power from the smoothing capacitor to the motor. Therefore, even when the connectors are not connected to each other or the power cable is disconnected, the electric power output to the power cable is small, so large electric power can be restrained from leaking to the outside. However, the control apparatus described in JP 2019-33568 A detects that the connectors are disengaged from each other or that the power cable is disconnected when the main switch is turned on, and assumes that the smoothing capacitor is not charged at the beginning of control. It is therefore impossible to determine that the connectors are disengaged from each other or that the power cable is disconnected when the vehicle runs.

This disclosure has been made in view of the foregoing technical problem, and it is an object of the disclosure to provide a control apparatus for an in-wheel motor vehicle that can swiftly perform disconnection control in the case where a power cable for connecting an electric power supply and a motor to each other is disconnected.

In order to achieve the aforementioned object, this disclosure provides a control apparatus for an in-wheel motor vehicle. The in-wheel motor vehicle is equipped with a motor provided in a tire wheel, at least one sensor provided in a case that accommodates the motor, an electric power supply provided on a vehicle body and an electrical storage device that stores electric power, a controller that is provided on the vehicle body to control the motor, a power cable that connects the motor to the electric power supply and the electrical storage device, and a sensor cable that connects the sensor and the controller to each other. The controller is configured to perform disconnection control for discharging the electric power stored in the electrical storage device to an extra device when the sensor cable is disconnected.

Besides, in this disclosure, the sensor may include a first sensor and a second sensor, and the sensor cable may include a first sensor cable that connects the first sensor and the controller to each other, and a second sensor cable that connects the second sensor and the controller to each other.

Besides, in this disclosure, the controller may be configured to perform the disconnection control when the first sensor cable and the second sensor cable are disconnected.

Besides, the controller may be configured to perform the disconnection control when one of the first sensor cable and the second sensor cable is disconnected and then the other sensor cable is disconnected within a predetermined time set in advance.

Besides, in this disclosure, the first sensor may include a temperature sensor that detects a temperature of the motor, and the second sensor may include a rotational speed sensor that detects a rotational speed of the motor.

Besides, in this disclosure, the power cable may be configured to be higher in rigidity than the sensor cable.

Besides, in this disclosure, the in-wheel motor vehicle may be equipped with a first connection portion for connecting the sensor cable to the controller, a second connection portion for connecting the sensor cable to the sensor, a third connection portion for connecting the power cable to the vehicle body, and a fourth connection portion for connecting the power cable to the motor, and may be configured such that a difference between a distance between the third connection portion and the fourth connection portion that are spaced farthest apart from each other as a result of a change in position of the tire wheel with respect to the vehicle and a length of the power cable is longer than a difference between a distance between the first connection portion and the second connection portion that are spaced farthest apart from each other as a result of a change in position of the tire wheel with respect to the vehicle and a length of the sensor cable.

Besides, in this disclosure, the in-wheel motor vehicle may be equipped with a power control unit that controls electric power supplied from the electric power supply to the motor, between the electric power supply and the power cable, the power control unit may have the electrical storage device, and a relay switch that selectively interrupts the transfer of electric power between the electric power supply and the electrical storage device, and the disconnection control may be designed to interrupt the transfer of electric power between the electric power supply and the electrical storage device by the relay switch, and discharge the electric power stored in the electrical storage device to the extra device.

Besides, in this disclosure, the in-wheel motor vehicle may be further equipped with an extra tire wheel different from the tire wheel, and an extra motor provided in the extra tire wheel, and the extra device may include the extra motor.

Moreover, in this disclosure, the extra motor may include a synchronous motor, and the disconnection control may be designed to discharge the electric power in the electrical storage device while controlling an output torque of the extra motor to 0, by causing a d-axis current to flow through the extra motor.

This disclosure makes it possible to determine earlier that the power cable is disconnected than in the case where it is determined whether or not the power cable is disconnected based on an output value of the electric power supply or a value of a current caused to flow through the motor, by determining that the power cable is disconnected and performing disconnection control when the sensor cable is disconnected. As a result, disconnection control for discharging the electric power stored in the electrical storage device to the extra device can be performed swiftly, so electric power can be restrained from leaking from the power cable to the outside.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
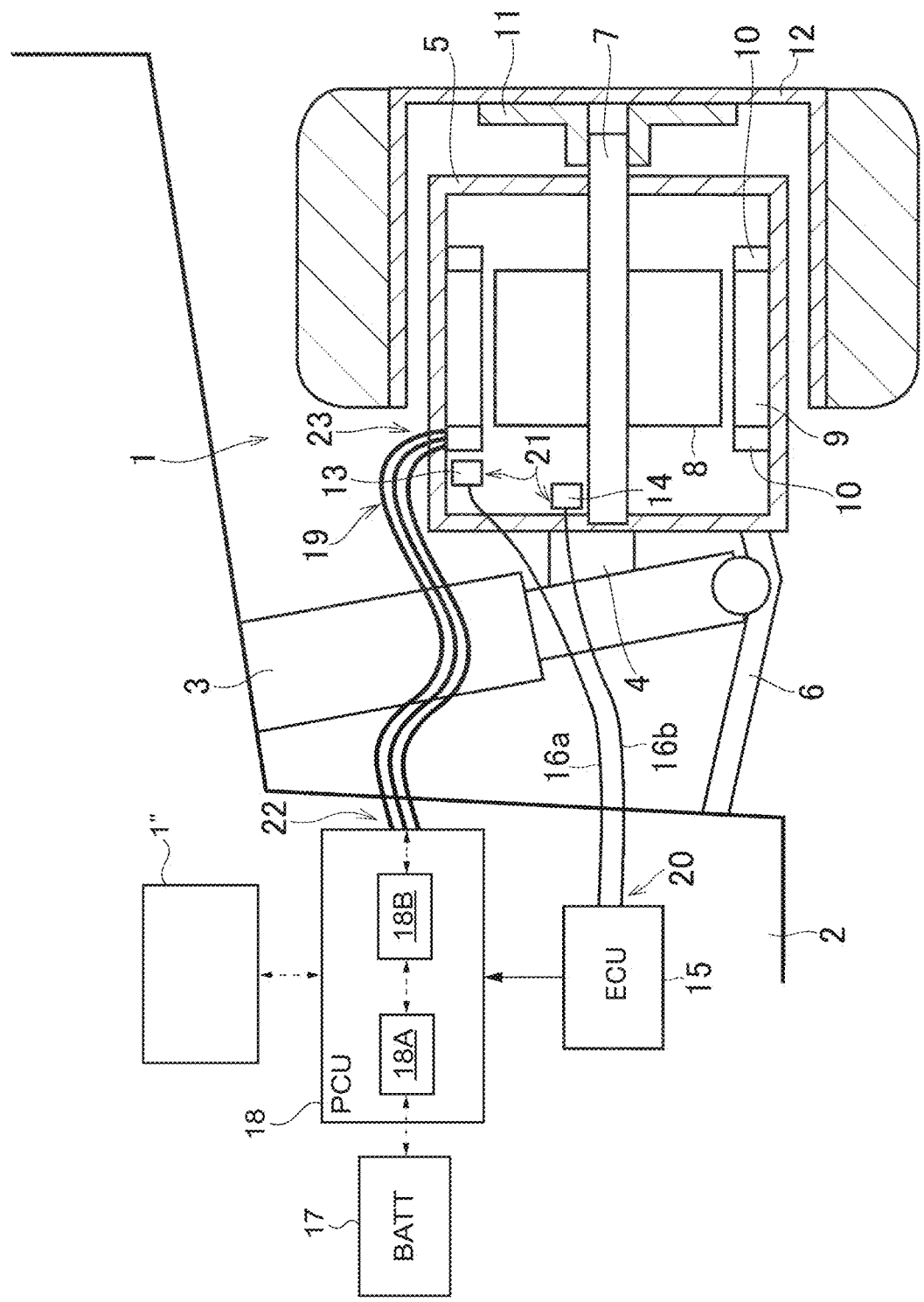
FIG. 1 is a schematic view for illustrating an example of an in-wheel motor vehicle in one of the embodiments of this disclosure.

FIG. 1 is a schematic view for illustrating an example of an in-wheel motor vehicle in one of the embodiments of this disclosure. In FIG. 1, an in-wheel motor (hereinafter referred to simply as the motor) 1 provided in a front-right wheel, a support structure for the motor 1, and a device that supplies electric power to the motor 1 are depicted in a schematic manner. Incidentally, a front-left wheel, a rear-right wheel, and a rear-left wheel can also be configured in the same manner.

The motor 1 shown in FIG. 1 is held in such a manner as to be able to move vertically with respect to a vehicle body 2. In concrete terms, a knuckle 4 is coupled to a suspension 3, and part of a case 5 of the motor 1 is coupled to the knuckle 4, as is the case with conventionally known wheels.

Besides, an end portion of a tie rod (or a knuckle arm) 6 that moves in a vehicle width direction in accordance with a steering amount of a steering wheel (not shown) is coupled to the case 5 of the motor 1, in such a manner as to rock around a central axis of the suspension 3 in accordance with a steering angle of the steering wheel. That is, the motor 1 is held on the vehicle body 2 by the suspension 3 and the tie rod 6. Incidentally, the motor 1 in the embodiment of this disclosure may not necessarily be supported on the vehicle body 2 by the suspension 3 and the tie rod 6, but may be supported by a lower arm, an upper arm, or the like. Besides, the motor 1 may not necessarily be provided in each of the front wheels, but may be provided in each of the rear wheels. In this case, the tie rod 6 may not be coupled to the motor 1.

The motor 1 shown in FIG. 1 is configured in the same manner as a motor provided as a drive force source of a battery electric vehicle, a hybrid electric vehicle or the like that is known conventionally. That is, the motor 1 functions as an electric power generator that can output a drive torque corresponding to an electric power with which the motor 1 is energized, and that converts kinetic energy of a driving wheel (a wheel) into electric energy by outputting a braking torque in such a manner as to reduce the rotational speed of the driving wheel. In concrete terms, the motor 1 is configured as a conventionally known AC motor such as a permanent magnet-type synchronous motor, an induction motor, or the like.

The motor 1 shown in FIG. 1 is configured as a permanent magnet-type synchronous motor of a three-phase AC type, and is constituted of an annular rotor 8 integrated with an output shaft 7 through spline engagement or the like, and an annular stator 9 formed on an outer peripheral side of the rotor 8, spaced apart therefrom by a predetermined gap, and fixed to the case 5.

The rotor 8 is configured by stacking annular steel plates, and permanent magnets (not shown) having a predetermined length in an axial direction are embedded in the outer peripheral side of the rotor 8. The stator 9 is also configured by stacking annular steel plates, and a plurality of stator teeth are formed in such a manner as to protrude on an inner peripheral side of the stator 9 at predetermined intervals in a circumferential direction. Moreover, coils 10 are wound around the stator teeth respectively.

The output shaft 7 of the motor 1 is rotatably held on the case 5 by a ball bearing or the like, and a flange member 11 is integrally rotatably coupled to a tip of the output shaft 7. Moreover, a tire wheel 12 in the shape of a bottomed cylinder is fixed to the flange member 11 by a bolt (not shown) or the like. Incidentally, at least part of the case 5 of the motor 1 is accommodated inside the tire wheel 12.

A temperature sensor 13 that detects a temperature of the stator 9, and a rotational speed sensor 14 such as a resolver that detects a rotational speed of the motor 1 are provided in the case 5. The sensors 13 and 14 are connected to an electronic control unit (hereinafter referred to as the ECU) 15 provided on the vehicle body 2, via a first sensor cable 16a and a second sensor cable 16b, respectively. The first sensor cable 16a and the second sensor cable 16b are identical in structure and function. Accordingly, in the following description, the first sensor cable 16a that connects the temperature sensor 13 and the ECU 15 to each other, and the second sensor cable 16b that connects the rotational speed sensor 14 and the ECU 15 to each other will be referred to comprehensively as sensor cables 16 in some cases, without being distinguished from each other. Incidentally, the motor 1 is provided with ammeters for detecting currents flowing through a U-phase, a V-phase, and a W-phase respectively. The ammeters are also connected to the ECU 15.

An electric power supply (BATT) 17 that supplies electric power to the motor 1 configured as described above, and a power control unit (hereinafter referred to as the PCU) 18 that controls the electric power supplied from the electric power supply 17 to the motor 1 (more concretely, the coils 10) are provided on the vehicle body 2.

As is the case with an electric power supply provided in a conventional battery electric vehicle or a conventional hybrid electric vehicle, the electric power supply 17 is configured as a secondary battery such as a lithium-ion battery or a nickel hydride battery. The PCU 18 is constituted of a smoothing capacitor 18B that stores electric power to smoothen the output voltage of the electric power supply 17, a relay switch 18A capable of selectively interrupting the transfer of electric power between the electric power supply 17 and the smoothing capacitor 18B, an inverter (not shown) for converting a DC voltage output from the electric power supply 17 into an AC voltage, and the like. The smoothing capacitor 18B is equivalent to an example of "the electrical storage device" of this disclosure. Incidentally, the PCU 18 is provided with a voltmeter (not shown) for detecting an output voltage of the smoothing capacitor, and the voltmeter and the ECU 15 are connected to each other.

Power cables 19 for transferring electric power between the PCU 18 and the coils 10 are connected to the PCU 18. Incidentally, since the motor 1 shown in FIG. 1 is a three-phase AC motor as described above, the three power cables 19 are connected to the PCU 18 in such a manner as to correspond to the phases respectively. Besides, the power cables 19 are configured to be bendable independently of one another, instead of being bundled together.

Besides, the ECU 15 to which the sensors 13 and 14 are connected is provided on the vehicle body 2. The ECU 15 is equivalent to an example of "the controller" of this disclosure, and is constituted mainly of a microcomputer. In addition to the sensors 13 and 14, various sensors (not shown) provided in a vehicle are connected to the ECU 15. The ECU 15 outputs signals for controlling the motor 1 and the like, based on signals detected by the sensors and arithmetic expressions, maps, or the like stored in advance. A concrete example will be described. The ECU 15 obtains a required driving force based on an amount of operation of an accelerator by a driver and a vehicle speed, and obtains a motor torque for outputting the required driving force thus obtained. The ECU 15 then outputs a switch signal corresponding to the obtained motor torque to a switch element (not shown) of the inverter provided in the PCU 18.

Incidentally, the ECU 15 and the PCU 18 are configured to control the electric power supplied to an extra in-wheel motor 1" (hereinafter referred to as the extra motor) as well. That is, the ECU 15 and the PCU 18 are configured to be able to appropriately control the electric power supplied to each of the motors, for example, to supply electric power to the extra motor 1" with the supply of electric power to the motor 1 stopped, or to make the electric power supplied to the motor 1 and the electric power supplied to the extra motor 1" different from each other.

As described above, the motor 1 shown in FIG. 1 is supported by the suspension 3. Therefore, the motor 1 moves vertically with respect to the vehicle body 2 due to, for example, the running of the vehicle on a bumpy road. Therefore, the shortest distance between a region where the sensor cables 16 are connected to the ECU 15 (a first connection portion) 20 and a region where the sensor cables 16 are connected to the motor 1 (a second connection portion) 21, and the shortest distance between a region where the power cables 19 are connected to the PCU 18 (a third connection portion) 22 and a region where the power cables 19 are connected to the motor 1 (a fourth connection portion) 23 change as the motor 1 moves vertically.

Besides, the motor 1 shown in FIG. 1 is provided in a steered wheel. Therefore, the shortest distance between the first connection portion 20 and the second connection portion 21, and the shortest distance between the third connection portion 22 and the fourth connection portion 23 change in accordance with a turning angle of the motor 1 with respect to the vehicle body 2.

Accordingly, the sensor cables 16 are formed longer than the distance between the first connection portion 20 and the second connection portion 21 that are spaced farthest apart from each other through a rise or fall of the motor 1 with respect to the vehicle body 2 and the turning of the motor 1 with respect to the vehicle body 2 within a range determined in advance. By the same token, the power cables 19 are formed longer than the distance between the first connection portion 20 and the second connection portion 21 that are spaced farthest apart from each other through a rise or fall of the motor 1 with respect to the vehicle body 2 and the turning of the motor 1 with respect to the vehicle body 2 within a range determined in advance.

Besides, the power cables 19 are energized with larger electric power than the sensor cables 16, and hence are formed thicker than the sensor cables 16. Accordingly, the power cables 19 are higher in rigidity than the sensor cables 16.

Furthermore, the power cables 19 are thicker than the sensor cables 16 as described above, and hence are also higher in bending rigidity than the sensor cables 16. Therefore, the power cables 19 are less likely to be bent than the sensor cables 16.

Therefore, the power cables 19 are formed with an excess length longer than that of the sensor cables 16. In concrete terms, the power cables 19 are formed such that the difference between the distance between the third connection portion 22 and the fourth connection portion 23 that are spaced farthest apart from each other through a rise or fall of the motor 1 with respect to the vehicle body 2 and also the turning of the motor 1 with respect to the vehicle body 2 and the length of the power cables 19 becomes longer than the difference between the distance between the first connection portion 20 and the second connection portion 21 that are spaced farthest apart from each other through a rise or fall of the motor 1 with respect to the vehicle body 2 and also the turning of the motor 1 with respect to the vehicle body 2 and the length of the sensor cables 16.

The power cables 19 are energized with relatively large electric power as described above. Therefore, when the power cables 19 are disconnected due to, for example, a collision of the vehicle, it is preferable to make a swift changeover to control (hereinafter referred to as disconnection control) for reducing the electric power output from the PCU 18 to the power cables 19. In more concrete terms, it is preferable to turn off the relay switch to electrically decouple the electric power supply 17 and the PCU 18 from each other, and energize the extra motor with the electric power stored in the smoothing capacitor to reduce the electric power stored in the smoothing capacitor.

On the other hand, when there is no intended correlation between a signal input from the voltmeter to the ECU 15 and signals input from the ammeters to the ECU 15, it is possible to determine that the power cables 19 are disconnected. However, the aforementioned correlation changes depending on various factors such as measurement errors of the voltmeter and the ammeters, magnetic forces of the permanent magnets corresponding to the temperature of the motor 1, aging and individual differences of the motor 1, or the like. Therefore, in order to prevent an erroneous determination that the power cables 19 are disconnected from being made due to such factors, it is impossible to determine that the power cables 19 are disconnected until the correlation between the voltmeter and the ammeters changes to a certain extent. In contrast, according to the configuration of the embodiment, it is possible to instantaneously determine, based on laws and regulations, whether or not the sensor cables 16 are disconnected.

Figure 2:
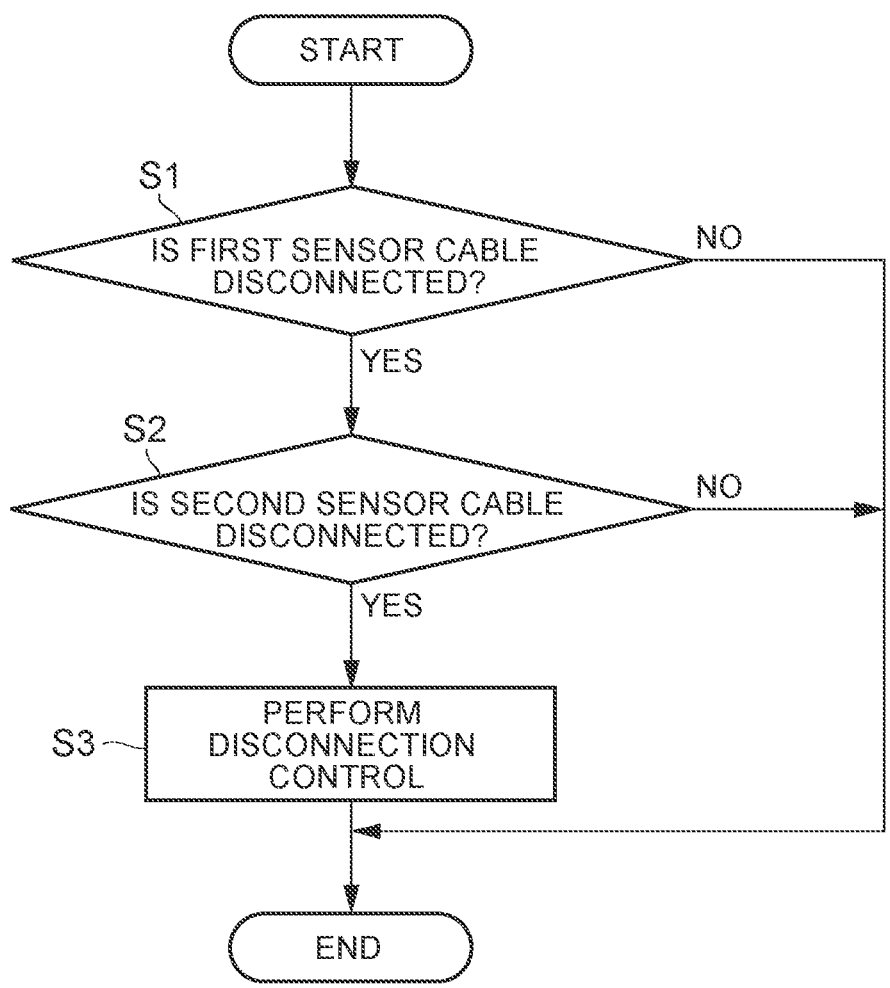
FIG. 2 is a flowchart for illustrating an example of control performed by a control apparatus of this disclosure.

Therefore, the control apparatus in the embodiment of this disclosure is configured to make a changeover to disconnection control when the sensor cables 16 are disconnected. FIG. 2 is a flowchart for illustrating an example of this control. In the example shown in FIG. 2, it is first determined whether or not the first sensor cable 16*a* that connects the temperature sensor 13 and the ECU 15 to each other is disconnected (step S1). In step S1, it may be determined, based on laws and regulations, whether or not the first sensor cable 16*a* is disconnected. That is, the result of the determination in step S1 is positive when a flag for determining whether or not the first sensor cable 16*a* is disconnected is on.

If the result of the determination in step S1 is positive on the grounds that the first sensor cable 16*a* is disconnected, it is determined whether or not the second sensor cable 16*b* that connects the rotational speed sensor 14 and the ECU 15 to each other is disconnected (step S2). In step S2 as well as step S1, it may be determined, based on laws and regulations, whether or not the second sensor cable 16*b* is disconnected. That is, the result of the determination in step S2 is positive when a flag for determining whether or not the second sensor cable 16*b* is disconnected is on.

As described above, the power cables 19 are higher in rigidity and longer in extra length than the sensor cables 16, and hence are less likely to be disconnected than the sensor cables 16. Accordingly, if the result of the determination in step S1 or step S2 is negative on the grounds that one of the first sensor cable 16*a* and the second sensor cable 16*b* is not disconnected, it is possible to determine that the load applied to the power cables 19 is not high enough to cause disconnection thereof, or that the motor 1 and the vehicle body 2 are not spaced apart from each other to such an extent that the power cables 19 are disconnected. That is, it is possible to determine that the power cables 19 are not disconnected. Therefore, if the result of the determination in step S1 or step S2 is negative, this routine is directly ended temporarily, without performing disconnection control.

On the contrary, if the results of the determinations in step S1 and step S2 are positive on the grounds that the first sensor cable 16*a* and the second sensor cable 16*b* are disconnected, the motor 1 is likely to have been disengaged from the vehicle body 2. That is, the power cables 19 are also likely to be disconnected. Therefore, in the control example shown in FIG. 2, disconnection control is performed on the assumption that the power cables 19 are disconnected (step S3), and this routine is ended temporarily. That is, the electric power supply 17 and the PCU 18 are decoupled from each other by opening the relay switch, and furthermore, the electric power stored in the smoothing capacitor is reduced by, for example, being supplied (discharged) to the extra motor. Incidentally, in the case where electric power is supplied from the smoothing capacitor to the extra motor, it is preferable, for example, to energize, with electric power, the phase (the d-axis) corresponding to the rotational angle of the extra motor to which electric power is supplied, such that no torque is output from the extra motor through the supply of electric power (i.e., in such a manner as to control the output torque to 0).

In the case where the first sensor cable 16*a* and the second sensor cable 16*b* are disconnected as described above, it is determined that the power cables 19 are disconnected, and disconnection control is performed. Thus, it is possible to determine that the power cables 19 are disconnected, earlier than in the case where it is determined, based on the output voltage of the PCU 18 and the value of the current caused to flow through the motor 1, whether or not the power cables 19 are disconnected. As a result, the electric power with which the power cables 19 are energized can be reduced swiftly.

Incidentally, according to the configuration of the aforementioned control example, it is determined that the power cables 19 are disconnected and disconnection control is performed when the two sensor cables 16*a* and 16*b* are disconnected. However, it is also acceptable to adopt a configuration in which disconnection control is performed when at least one of the sensor cables 16*a* and 16*b* is disconnected. Besides, in the case where, for example, the motor 1 is cooled or oil is encapsulated in the case 5 to lubricate sliding portions, a sensor for detecting a temperature of the oil may be provided, and disconnection control may be performed when the sensor is disconnected. As in this case, the sensor cable for determining whether or not the power cables 19 are disconnected may not necessarily be the first sensor cable 16*a* or the second sensor cable 16*b*. Furthermore, in the case where three or more sensor cables are provided, for example, the sensor that detects the temperature of oil is provided in addition to the first sensor cable 16*a* and the second sensor cable 16*b*, it is acceptable to adopt a configuration in which disconnection control is performed on the assumption that the power cables 19 are disconnected when the three or more sensor cables are disconnected.

On the other hand, when the respective sensor cables 16*a* and 16*b* are disconnected individually, for example, when the first sensor cable 16*a* is disconnected and then the second sensor cable 16*b* is disconnected after the lapse of a predetermined time from the disconnection of the first sensor cable 16*a*, the power cables 19 may not be disconnected. When disconnection control is performed in this case, it becomes impossible to output electric power to the extra motor as well, so it becomes impossible to cause the vehicle to run through driving.

Figure 3:
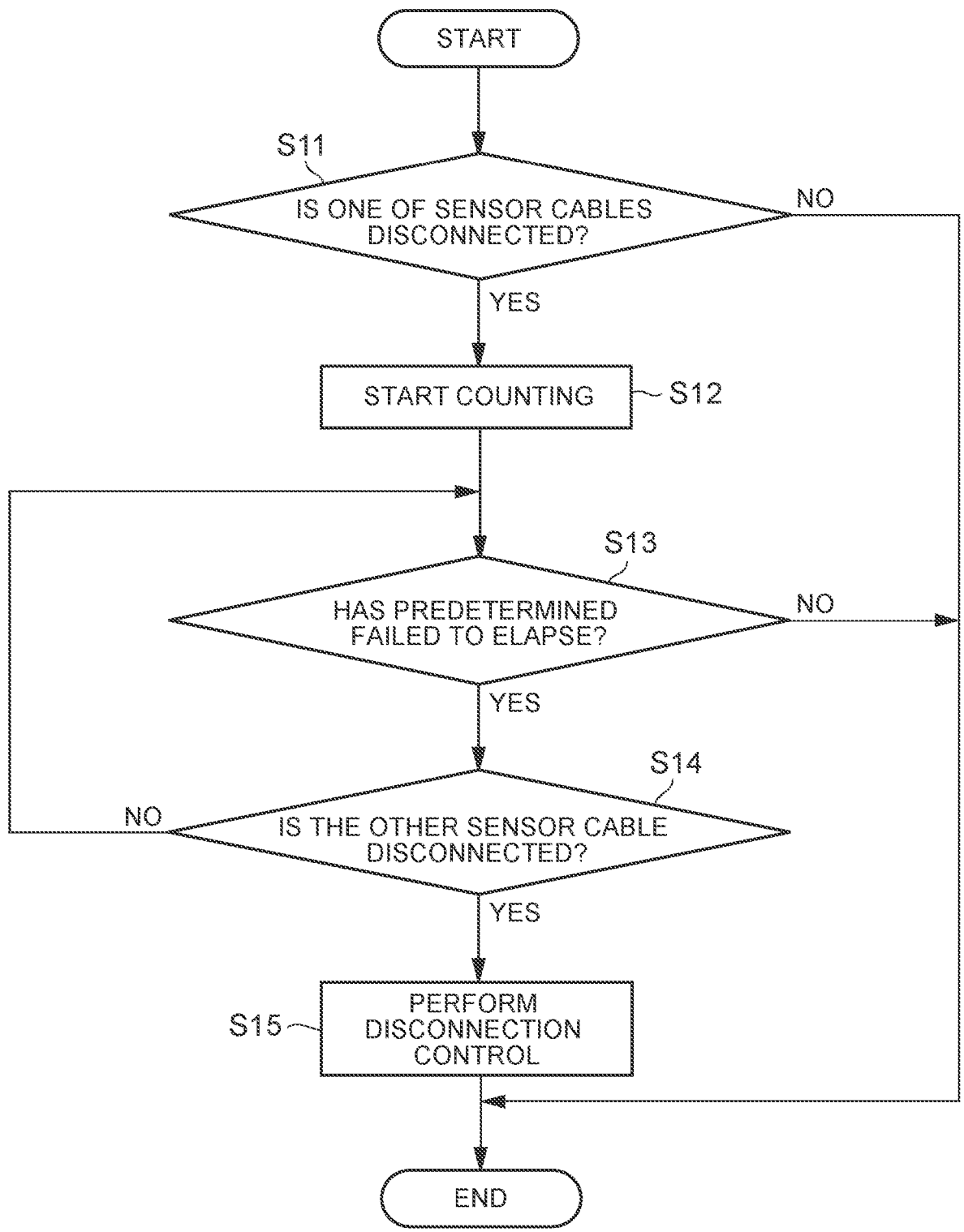
FIG. 3 is a flowchart for illustrating another example of control performed by the control apparatus of this disclosure.

Therefore, according to the configuration of the control example shown in FIG. 3, it is determined that the power cables 19 are disconnected and disconnection control is performed when the first sensor cable 16*a* and the second sensor cable 16*b* are disconnected substantially at the same time. Accordingly, in the control example shown in FIG. 3, it is first determined whether or not the sensor cable 16*a* (16*b*), namely, one of the first sensor cable 16*a* and the second sensor cable 16*b* is disconnected (step S11). The determination in step S11 can be made in the same manner as the determinations in step S1 and step S2 in the control example shown in FIG. 2.

If the result of the determination in step S11 is positive on the grounds that the sensor cable 16*a* (16*b*) is disconnected, the counting of a timer is started (step S12), and it is subsequently determined whether or not a predetermined time set in advance has failed to elapse since the positive determination in step S11 (step S13). The predetermined time in step S13 can be determined as a time that is considered to be taken from disconnection of the sensor cable 16*a* (16*b*) to disconnection of the other sensor cable 16*b* (16*a*) in the case where the wheel of the vehicle is detached due to a collision thereof.

Accordingly, if the result of the determination in step S13 is positive on the grounds that the predetermined time has not elapsed since the positive determination in step S11, it is determined whether or not the other sensor cable 16*b* (16*a*) is disconnected (step S14). The determination in step S14 can be made in the same manner as the determinations in step S1 and step S2 in the control example shown in FIG. 2.

If the result of the determination in step S14 is positive on the grounds that the other sensor cable 16*b* (16*a*) is disconnected, that is, when the first sensor cable 16*a* and the second sensor cable 16*b* are disconnected during the predetermined time, the power cables 19 are likely to be disconnected due to the detachment of the wheel of the vehicle or the like. Therefore, in the control example shown in FIG. 3, if the result of the determination in step S14 is positive, it is determined that the power cables 19 are disconnected and disconnection control is performed (step S15), and this control is ended temporarily.

On the other hand, if the result of the determination in step S11 is negative on the grounds that the respective sensor cables 16*a* and 16*b* are not disconnected, or if the result of the determination in step S13 is negative on the grounds that the predetermined time has elapsed since disconnection of the sensor cable 16*a* (16*b*), this routine is directly ended temporarily. Besides, when the time that has elapsed since disconnection of the sensor cable 16*a* (16*b*) is shorter than the predetermined time and the other sensor cable 16*b* (16*a*) is not disconnected, a return to step S13 is made. That is, step S13 and step S14 are repeatedly carried out until the predetermined time elapses or the other sensor cable 16*b* (16*a*) is disconnected.

An erroneous determination on disconnection of the power cables 19 can be restrained from being made, by performing disconnection control on the assumption that the power cables 19 are disconnected, only when the sensor cable 16*a* (16*b*) and the other sensor cable 16*b* (16*a*) are disconnected within the predetermined time as described above. As a result, when the respective sensor cables 16*a* and 16*b* are disconnected and the power cables 19 are not disconnected, the limp home running of the vehicle can be realized by, for example, supplying electric power to the extra motor. In this case as well, large electric power can be restrained from leaking to the outside, since the power cables 19 are not disconnected.

Incidentally, when only the first sensor cable 16*a* is disconnected, it becomes impossible to detect the temperature of the motor 1, but the vehicle may run with the output of the motor 1 limited. Besides, when only the second sensor cable 16*b* is disconnected, it becomes impossible to detect the rotational speed of the motor 1, but the vehicle may run through the use of the extra motor.

Incidentally, the in-wheel motor vehicle in the embodiment of this disclosure may be a vehicle that is equipped with in-wheel motors in all wheels thereof respectively, or a vehicle that is equipped with in-wheel motors in either a pair of front wheels thereof or a pair of rear wheels thereof respectively and that is configured to drive the other wheels by an extra drive force source provided on a vehicle body. Besides, an extra mechanism may be provided between each of the in-wheel motors and a tire wheel. For example, a deceleration mechanism may be provided on an output shaft of each of the in-wheel motors.

What is claimed is:

1. A control apparatus for an in-wheel motor vehicle that is equipped with a motor provided in a tire wheel, at least one sensor provided in a case that accommodates the motor, an electric power supply provided on a vehicle body and an electrical storage device that stores electric power, a controller that is provided on the vehicle body to control the motor, a power cable that connects the motor to the electric power supply and the electrical storage device, and a sensor cable that connects the sensor and the controller to each other, wherein
the controller is configured to perform disconnection control for discharging the electric power stored in the electrical storage device to an extra device in response to determining that the power cable is disconnected when the sensor cable is disconnected.

2. The control apparatus for the in-wheel motor vehicle according to claim 1, wherein
the sensor includes a first sensor and a second sensor, and
the sensor cable includes a first sensor cable that connects the first sensor and the controller to each other, and a second sensor cable that connects the second sensor and the controller to each other.

3. The control apparatus for the in-wheel motor vehicle according to claim 2, wherein
the controller is configured to determine that the power cable is disconnected when the first sensor cable and the second sensor cable are both disconnected.

4. The control apparatus for the in-wheel motor vehicle according to claim 2, wherein
the first sensor includes a temperature sensor that detects a temperature of the motor, and
the second sensor includes a rotational speed sensor that detects a rotational speed of the motor.

5. The control apparatus for the in-wheel motor vehicle according to claim 1, wherein
the power cable is configured to be higher in rigidity than the sensor cable.

6. The control apparatus for the in-wheel motor vehicle according to claim 1, wherein
the in-wheel motor vehicle is equipped with a first connection portion for connecting the sensor cable to the controller, a second connection portion for connecting the sensor cable to the sensor, a third connection portion for connecting the power cable to the vehicle body, and a fourth connection portion for connecting the power cable to the motor, and
the in-wheel motor vehicle is configured such that a difference between a distance between the third connection portion and the fourth connection portion that are spaced farthest apart from each other as a result of a change in position of the tire wheel with respect to the vehicle and a length of the power cable is longer than a difference between a distance between the first connection portion and the second connection portion that are spaced farthest apart from each other as a result of a change in position of the tire wheel with respect to the vehicle and a length of the sensor cable.

7. The control apparatus for the in-wheel motor vehicle according to claim 1, wherein
the in-wheel motor vehicle is equipped with a power control unit that controls electric power supplied from the electric power supply to the motor, between the electric power supply and the power cable,
the power control unit has the electrical storage device, and a relay switch that selectively interrupts transfer of electric power between the electric power supply and the electrical storage device, and
the disconnection control is designed to interrupt the transfer of the electric power between the electric power supply and the electrical storage device in the power control unit by the relay switch, and discharge the electric power stored in the electrical storage device to the extra device.

8. The control apparatus for the in-wheel motor vehicle according to claim 1, wherein
the in-wheel motor vehicle is further equipped with an extra tire wheel different from the tire wheel, and an extra motor provided in the extra tire wheel, and
the extra device includes the extra motor.

9. The control apparatus for the in-wheel motor vehicle according to claim 8, wherein the extra motor includes a synchronous motor, and the disconnection control is designed to discharge the electric power in the electrical storage device while controlling an output torque of the extra motor to 0, by causing a d-axis current to flow through the extra motor.

10. A control apparatus for the in-wheel motor vehicle that is equipped with a motor provided in a tire wheel, at least one sensor provided in a case that accommodates the motor, an electric power supply provided on a vehicle body and an electrical storage device that stores electric power, a controller that is provided on the vehicle body to control the motor, a power cable that connects the motor to the electric power supply and the electrical storage device, and a sensor cable that connects the sensor and the controller to each other, wherein the sensor includes a first sensor and a second sensor, and the sensor cable includes a first sensor cable that connects the first sensor and the controller to each other, and a second sensor cable that connects the second sensor and the controller to each other, the controller is configured to perform disconnection control for discharging the electric power stored in the electrical storage device to an extra device when one of the first sensor cable and the second sensor cable is disconnected and then the other sensor cable is disconnected within a predetermined time set in advance.

\* \* \* \* \*